US009720957B2

United States Patent
van Roermund et al.

(10) Patent No.: US 9,720,957 B2
(45) Date of Patent: Aug. 1, 2017

(54) AGGREGATOR NODE, METHOD FOR AGGREGATING DATA, AND COMPUTER PROGRAM PRODUCT

(71) Applicant: NXP B.V., Eindhoven (NL)

(72) Inventors: Timotheus Arthur van Roermund, Eindhoven (NL); Maarten Christiaan Pennings, Waalre (NL); Hugh Maaskant, Son (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/208,151

(22) Filed: Mar. 13, 2014

(65) Prior Publication Data

US 2015/0082023 A1  Mar. 19, 2015

(30) Foreign Application Priority Data

Apr. 18, 2013 (EP) ................................ 13164245

(51) Int. Cl.
*G06F 21/00* (2013.01)
*G06F 17/30* (2006.01)
*H04L 29/06* (2006.01)
*G01D 4/00* (2006.01)

(52) U.S. Cl.
CPC .... *G06F 17/30412* (2013.01); *H04L 63/0435* (2013.01); *H04L 63/0464* (2013.01); *G01D 4/002* (2013.01); *Y02B 90/241* (2013.01); *Y04S 20/32* (2013.01)

(58) Field of Classification Search
USPC ...................................................... 713/154
See application file for complete search history.

(56) References Cited

U.S. PATENT DOCUMENTS

| | | | | |
|---|---|---|---|---|
| 8,000,468 B2* | 8/2011 | Huang | .................. | H04L 9/0833 380/28 |
| 8,295,491 B2* | 10/2012 | Armknecht | ............. | H04L 9/083 380/270 |
| 8,527,353 B2* | 9/2013 | Lahaie et al. | ............... | 705/14.71 |
| 8,555,400 B2* | 10/2013 | Shi et al. | ........................ | 726/26 |
| 8,589,490 B2* | 11/2013 | Tapolcai et al. | .............. | 709/205 |
| 8,687,800 B2 | 4/2014 | Patel | | |
| 8,832,429 B2* | 9/2014 | Gomez Marmol | ... | H04L 9/0891 370/328 |
| 2004/0030912 A1* | 2/2004 | Merkle et al. | ................ | 713/200 |
| 2009/0089789 A1* | 4/2009 | Faltings et al. | ............... | 718/104 |

(Continued)

FOREIGN PATENT DOCUMENTS

EP    2 489 985 A1    8/2012
JP    2010-500630 A   1/2010

(Continued)

OTHER PUBLICATIONS

TNO. PowerMatcher http://www.powermatcher.net.

(Continued)

*Primary Examiner* — Mahfuzur Rahman

(57) ABSTRACT

According to an aspect of the invention, an aggregator node is conceived for use in a network, wherein said aggregator node is arranged to aggregate encrypted data, and wherein said aggregator node comprises a secure element which is arranged to perform the aggregation of the encrypted data in a secure manner.

12 Claims, 3 Drawing Sheets

(56) References Cited

U.S. PATENT DOCUMENTS

| | | | | |
|---|---|---|---|---|
| 2009/0141898 | A1* | 6/2009 | Huang | H04L 9/0833 380/270 |
| 2010/0135494 | A1* | 6/2010 | Armknecht | H04L 9/083 380/270 |
| 2012/0137126 | A1 | 5/2012 | Matsuoka et al. | |
| 2013/0124850 | A1* | 5/2013 | Gomez Marmol | H04L 9/0891 713/150 |
| 2013/0312072 | A1 | 11/2013 | van Roermund et al. | |

FOREIGN PATENT DOCUMENTS

| | | |
|---|---|---|
| JP | 2011-175039 A | 9/2011 |
| JP | 2012-113670 A | 6/2012 |
| JP | 2012-165374 A | 8/2012 |

OTHER PUBLICATIONS

Kok, J.K., et al; Intelligence in Electricity Networks for Embedding Renewables and Distributed Generation; Energy Research Centre of the Netherlands (ECN) Overview Article; 31 pages (2009).

Bartoli, A., et al; "Secure Lossless Aggregation for Smart Grid M2M Networks"; IEEE International Conference on Smart Grid Communications; IEEE Piscataway, NJ, USA, pp. 333-338 (Oct. 4, 2010).

Extended European Search Report for Application No. 13164245.6 (Sep. 13, 2013).

"Office Action for Japanese Application No. 2014-050659 dated Mar. 17, 2015".

Kikuchi, et al., "An Experiment of Perturbation-Reconstruction Method on Power Consumption Data", IEICE Technical REport, Japan, The Institute of Electronics, Information and Communication Engineers, vol. 112, No. 466, pp. 89-94, Feb. 28, 2013.

Suzuki, "The proposal of the communication model with anonymity and unobservability", Mutlitmedia, Distributed, Cooperative, and Mobile (DICOMO 2007) Symposium, Japan, Information Processing Society of Japan, vol. 2007, NMp/ 1, pp. 1145-1150, Jul. 4, 2007.

Takaoka, et al., "A study of a Data Transmission Mechanism to Reduce Traffic", Mutimedia, Distributed, Cooperative, and Mobile (DICOMO 2007) Symposium, Japan, Information Processing Society of Japan, Vo. 2007, No. 1, pp. 946-950, Jul. 4, 2007.

\* cited by examiner

AGGREGATOR NODE, METHOD FOR AGGREGATING DATA, AND COMPUTER PROGRAM PRODUCT

CROSS-REFERENCE TO RELATED APPLICATIONS

This application claims the priority under 35 U.S.C. §119 of European patent application no. 13164245.6 filed on Apr. 18, 2013 the contents of which are incorporated by reference herein.

FIELD OF THE INVENTION

The invention relates to an aggregator node, to a corresponding method for aggregating data, and to a corresponding computer program product.

BACKGROUND OF THE INVENTION

Nowadays, energy systems more and more exchange data such as meter readings. In the future, also data that reflects the energy demand of e.g. individual appliances or households will be used, especially in so-called smart grids. This data is typically sent upstream in a tree-like network. At a next node in the network, the data is typically aggregated for several reasons, for example because the aggregated value is typically the most relevant and interesting to the nodes higher in the network, because concentrating the information improves scalability and because the level of privacy for the nodes lower in the network can be increased by aggregating the data.

FIG. 1 illustrates an example of an energy network with a tree topology. In particular, it illustrates a typical network structure for an Advanced Metering Infrastructure (AMI). The energy network 100 comprises a network aggregator 101 at the highest level of the network tree or hierarchy, city aggregators 102, 103, 104 at one level below the network aggregator 101, and neighborhood aggregators 105, 106, 107 at one level below the city aggregators 102, 103, 104. In operation, a first neighborhood aggregator 105 aggregates energy data received from a first plurality of energy meters 108, 109, 110. A second neighborhood aggregator 106 aggregates energy data received from a second plurality of energy meters 111, 112, 113. A third neighborhood aggregator 107 aggregates energy data received from a third plurality of energy meters 114, 115, 116. The neighborhood aggregators 105, 106, 107 send their aggregated energy data to city aggregator 103, which in turn performs another aggregation of data and sends its aggregated data to the network aggregator 101.

FIG. 2 illustrates an example of a system architecture 200 for an energy network of the future. Energy networks of the future, which are often referred to as smart grids, will probably exchange even more data than present-day energy networks. Furthermore, these data will typically be sensitive in nature. The nodes in such a network are typically devices such as white goods, electric vehicles, photovoltaic (PV) panels, e-meters, home energy gateways etc. An example of a system for such future networks is the so-called "PowerMatcher" system (disclosed on the website http://www.powermatcher.net/).

The "PowerMatcher" system 200 aims at balancing the energy demands (consumption side) and offerings (production side) in a distributed energy system. This balancing is performed as follows: devices send bids upstream, that reflect their current energy demand (positive price, showing what they want to pay) and/or their energy offering (negative price, showing for what price they want to deliver energy). The next upstream node aggregates the bids of the different devices and sends this aggregated bid up to the next node in the tree. This mechanism is continued up to the top level node, i.e. the so-called "Auctioneer". This node has an overview of the total energy demand and supply in the network. Based on this overview, it determines a market equilibrium in consumption and production (and the associated "price"), which is sent downstream to the different devices. The devices can then adjust their actual energy consumption based on the new market price.

Energy networks of the future may have the disadvantage that a large amount of detailed, personal data is available. The exchange and processing of such data in a network comprising unprotected network nodes poses a large privacy problem. There are many research papers that show, for example, that it is quite easy to deduce a lot of information about a household (e.g. the number of rooms, the number of people inside the home, the kind of devices that they have and use, which TV channel they watch etc.) merely by reading the instantaneous consumption data, as can be done in an Advanced Metering Infrastructure (AMI).

Furthermore, energy networks of the future may have the disadvantage that for certain types of data the exposure of said data could allow third parties to profit at the expense of the data-sending party or parties. An example of such a situation is when the data contains e.g. a bid on a certain commodity; if exposed to another party or parties that party or those parties could take the original bid into account when formulating their bid—thereby "gaming" the system.

SUMMARY OF THE INVENTION

It is an object of the invention to overcome, at least partially, the above-mentioned disadvantages. This object is achieved by an aggregator node as claimed in claim 1, by a corresponding method for aggregating data as claimed in 11, and to a corresponding computer program product as claimed in claim 12.

According to an aspect of the invention, an aggregator node is conceived for use in a network, wherein said aggregator node is arranged to aggregate encrypted data, and wherein said aggregator node comprises a secure element which is arranged to perform the aggregation of the encrypted data in a secure manner.

According to an exemplary embodiment of the aggregator node, the secure element is arranged to perform the aggregation of the encrypted data by: decrypting the encrypted data using a first cryptographic key; aggregating the decrypted data; encrypting the aggregated data using a second cryptographic key.

According to a further exemplary embodiment of the aggregator node, the secure element comprises: a cryptographic unit being arranged to decrypt the encrypted data and to encrypt the aggregated data; a processing unit being arranged to aggregate the decrypted data; a storage unit being arranged to store at least the first cryptographic key and the second cryptographic key.

According to a further exemplary embodiment of the aggregator node, the storage unit is further arranged to store the encrypted data to be aggregated and/or the decrypted data to be aggregated.

According to a further exemplary embodiment of the aggregator node, the aggregator node is further arranged to receive the encrypted data from at least one child node in the network.

According to a further exemplary embodiment of the aggregator node, the aggregator node is further arranged to send the encrypted aggregated data to a parent node in the network.

According to a further exemplary embodiment of the aggregator node, the secure element is further arranged to randomize, at least partially, the aggregated data.

According to a further exemplary embodiment of the aggregator node, the secure element is further arranged to randomize, at least partially, the frequency at which and/or the times at which the aggregated data is sent to a parent node in the network.

According to a further exemplary embodiment of the aggregator node, the secure element is further arranged to only send the aggregated data to a parent node in the network when the aggregated data is significantly different from the result of a previous aggregation.

According to a further exemplary embodiment of the aggregator node, the data comprise energy data and/or data associated to energy data, in particular financial data associated to energy data.

According to a further aspect of the invention, a network is conceived, in particular an energy network, comprising a plurality of aggregator nodes as claimed in any preceding claim.

According to a further aspect of the invention, a method is conceived for aggregating data in a network, wherein an aggregator node aggregates encrypted data, and wherein said aggregator node comprises a secure element which performs the aggregation of the encrypted data in a secure manner.

According to a further aspect of the invention, a computer program product is conceived that comprises program instructions that, when being executed by a processing unit, carry out or control steps of a method of the kind set forth.

BRIEF DESCRIPTION OF THE DRAWINGS

The invention will be described in more detail with reference to the appended drawings, in which.

DESCRIPTION OF EMBODIMENTS

In accordance with the present disclosure, (privacy) sensitive data, when being aggregated, is only exposed in plain text within a secured piece of hardware, i.e. a secure element. Outside of the secure element the sensitive data is only available in encrypted form and the cryptographic keys that are used to encrypt/decrypt the sensitive data reside in the secure element. Examples of these cryptographic keys are symmetric (secret) keys and asymmetric (private/public) keys.

The secure element is a tamper-resistant hardware and/or software module which can store data (e.g. in a non-volatile memory unit) and perform (cryptographic) operations on these data (i.e. in a cryptographic unit). The skilled person will appreciate that a secure element typically has advanced security features, which make it tamper-resistant. The level of tamper-resistance of secure elements is often evaluated by external parties. A typical example is the evaluation according to a Protection Profile and Security Target specified according to the standard "Common Criteria for Information Technology Security Evaluation".

In a typical example, the secure element will receive cipher text messages from the outside world, which it will decrypt using the appropriate key—i.e. the key corresponding to the source of the data—that is stored in its internal (protected) memory. Subsequently, the secure element can aggregate multiple data samples into one or more new data samples, which it will encrypt using the appropriate key—i.e. the key corresponding to the envisioned receiver of the data. In general, aggregation will take place in space (aggregation of data from multiple sub-nodes) and/or time (aggregation of multiple data samples from the same node). The skilled person will appreciate that the aggregator node may also perform aggregation operations on zero inputs (e.g. a kind of "dummy" operations) such that it may send encrypted aggregated data to a parent node even if there are no data to be aggregated. Thereby, an attacker will not see a change in traffic originating from said aggregator node. It is noted that aggregation of data is known as such and that the skilled person will be able to choose an appropriate method for aggregating data depending on the requirements in a particular context.

Finally, the secure element will send the encrypted data to the outside world again. By only having a plain text copy of the data available in a highly secured piece of hardware, i.e. the secure element, it is very difficult for unauthorized persons to get access to said data. It is noted that the keys may also be different per "link" between two secure elements. This is not a strict requirement, but in practice it is often preferred to use different keys, e.g. because the network is managed by different parties who each use their own keys or key sets.

Figure 1:
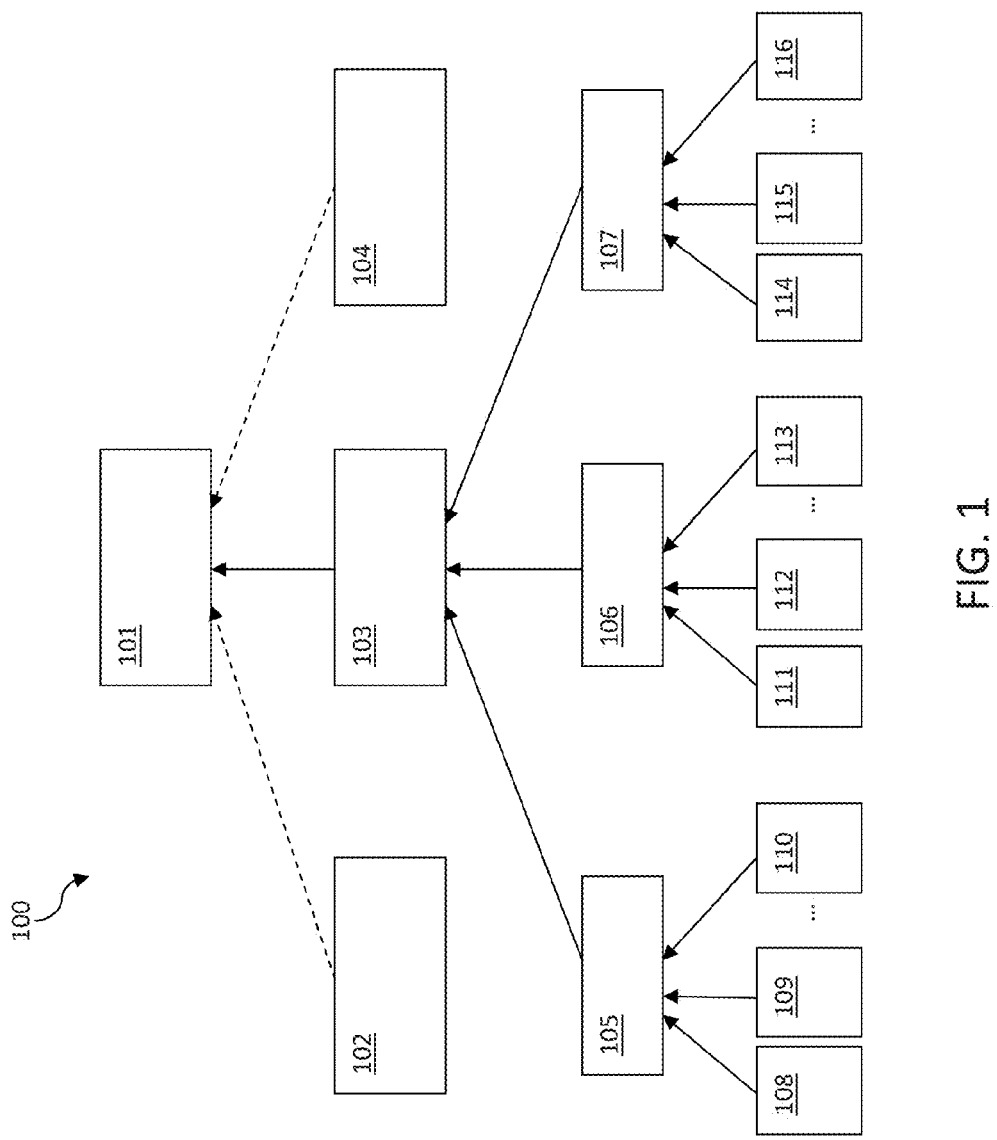
FIG. 1 illustrates an example of an energy network with a tree topology.
Figure 2:
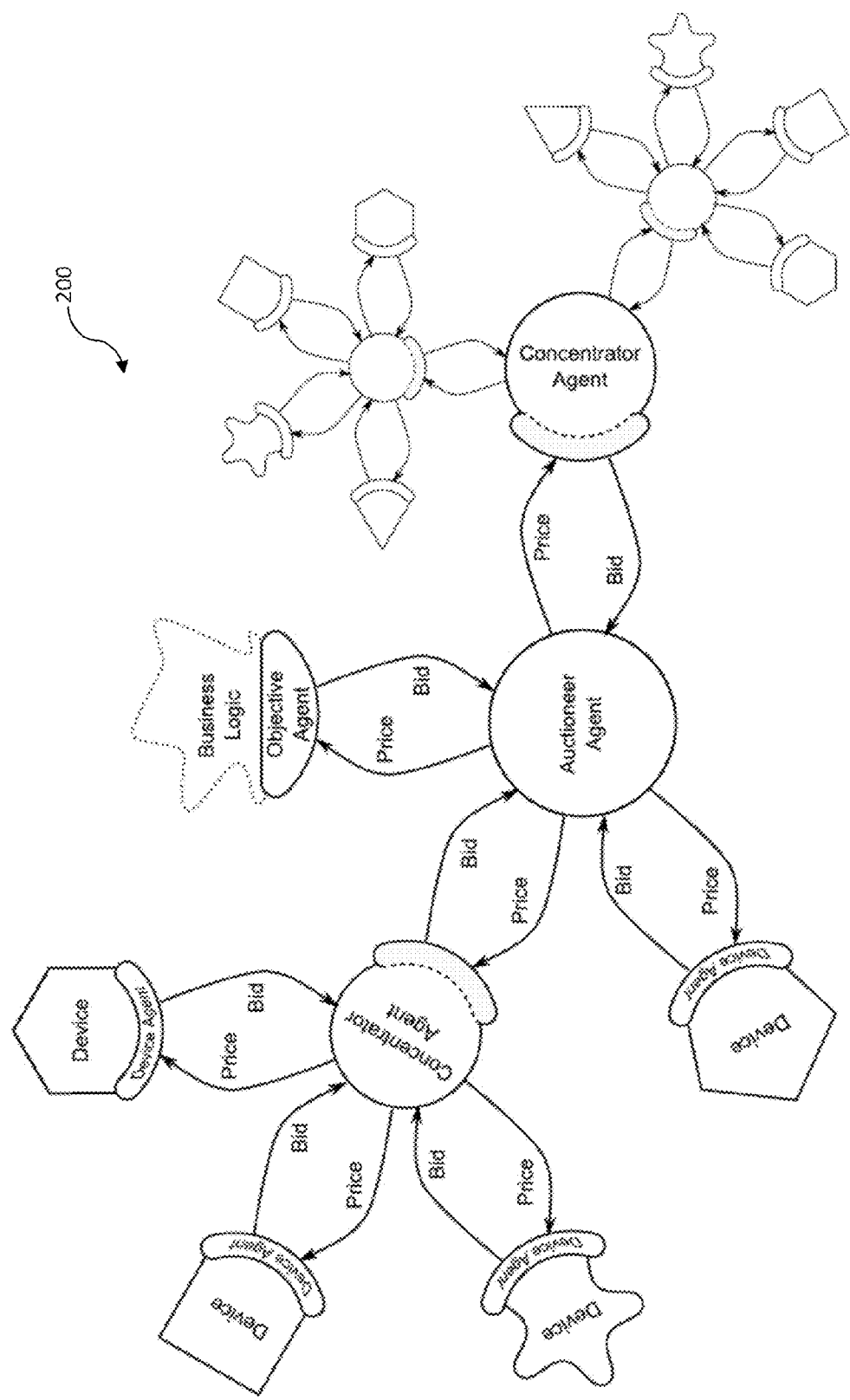
FIG. 2 illustrates an example of a system architecture for an energy network of the future.
Figure 3:
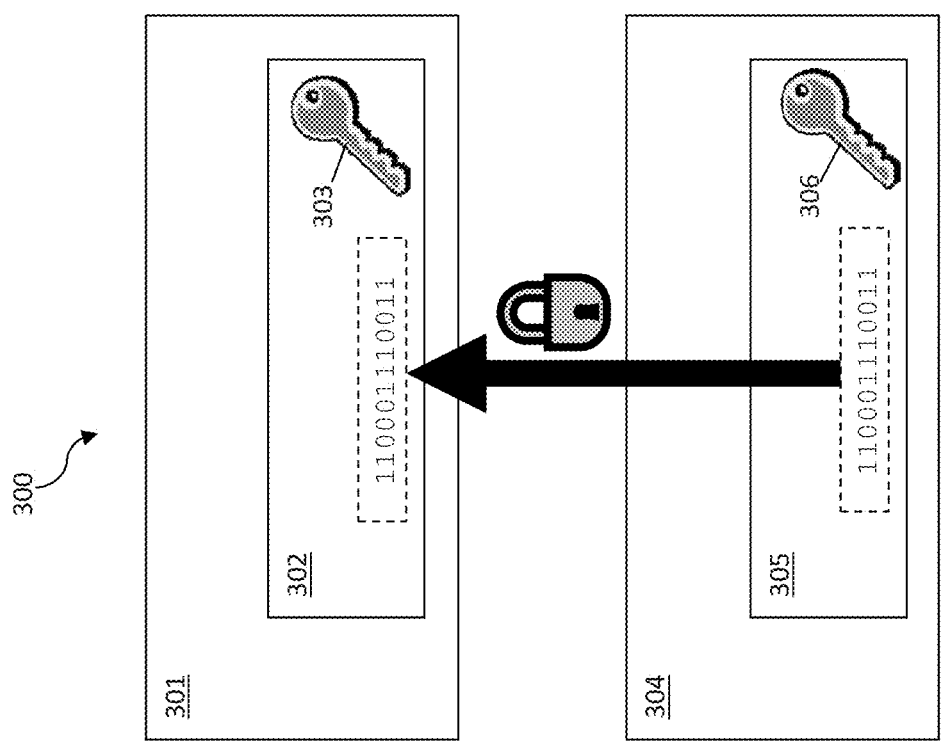
FIG. 3 illustrates an exemplary embodiment of the invention.

FIG. 3 illustrates an exemplary embodiment of the invention. In particular, it illustrates the concept of exposing a plain text version of sensitive data only in a secure element of an aggregator node. A plain text version of sensitive data, for example energy data measured by an energy meter, is available in a secure element 305 of a child node 304. The secure element 305 of the child node 304 encrypts the sensitive data using an encryption key 306 and subsequently sends the encrypted sensitive data to an aggregator node 301. A secure element 302 of the aggregator node 301 decrypts the sensitive data using a decryption key 303 such that a plain text copy of the sensitive data becomes available. The secure element 302 of the aggregator node 301 may now aggregate said sensitive data with sensitive data received from, for example, other child nodes (not shown), encrypt the aggregated sensitive data and send the encrypted aggregated sensitive data to a further aggregator node (not shown) which is higher in the network tree, for example.

Additionally, a secure element may add some noise (i.e. randomize) aggregated sensitive data in order to further protect the privacy of the people involved in the system. For example, in a bidding system such as the above-mentioned PowerMatcher system, this would mean that the aggregated bid is slightly adjusted (e.g. increased or decreased, or delayed or repeated). This may be advantageous, since somewhere in the system, the aggregated data may leave the secure element because it is needed in an external control mechanism. For example, in the PowerMatcher system, it would be necessary to calculate the market equilibrium. Whether or not such randomization is allowed, depends on the system that uses the aggregated data.

Reiterating, a network may contain a tree or hierarchy of aggregator nodes which are arranged to aggregate encrypted sensitive data. For this purpose, the aggregator nodes comprise secure elements which are arranged to perform the aggregation of the sensitive data in a secure manner. In order to set up the network, a secure element must be added to the system partitioning of the nodes in the network. Next, one needs to put secure key distribution and management procedures in place, but there are well-known techniques to achieve this. In large and distributed systems, a public-key infrastructure (PKI) based solution may be used, for example. For smaller (in-home) networks, Ease-of-Install based solutions could be used, such as the solution described in the European patent application titled "Method for establishing secure communication between nodes in a network, network node, key manager, installation device and computer program product", having application number EP12168079.7 and filed by applicant NXP B.V. on 15 May 2012. Finally, the secure elements must contain logic, implemented in hardware and/or software, to execute the decryption of the received data and the aggregation operation on the data, to encrypt the aggregate data and to make them available to the outside world.

It is noted that the drawings are schematic. In different drawings, similar or identical elements are provided with the same reference signs. Furthermore, it is noted that in an effort to provide a concise description of the exemplary embodiments, implementation details which fall into the customary practice of the skilled person may not have been described. It should be appreciated that in the development of any such implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

The above-mentioned embodiments illustrate rather than limit the invention, and the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. The invention may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE NUMBERS 100 energy network
101 network aggregator
102 city aggregator
103 city aggregator
104 city aggregator
105 neighborhood aggregator
106 neighborhood aggregator
107 neighborhood aggregator
108 energy meter
109 energy meter
110 energy meter
111 energy meter
112 energy meter
113 energy meter
114 energy meter
115 energy meter
116 energy meter
200 system architecture
300 data aggregation
301 aggregator node
302 secure element
303 decryption key
304 child node
305 secure element
306 encryption key

The invention claimed is:

1. An aggregator node device for use in a network having a plurality of nodes, wherein said aggregator node is configured to aggregate encrypted data, and comprises a secure element which is configured to perform the aggregation of the encrypted data in a secure manner by receiving the encrypted data from multiple other nodes in the network where each other node encrypted its own data and added noise, decrypting the encrypted data which was received from each of the multiple other nodes, using a first cryptographic key into an unencrypted plain text form, aggregating the decrypted data, and encrypting the aggregated data using a second cryptographic key, wherein the unencrypted plain text form is only available in a highly secured piece of hardware in the secure element.

2. The aggregator node device as claimed in claim 1, wherein the secure element comprises:
a cryptographic unit configured to decrypt the encrypted data and to encrypt the aggregated data;
a processing unit configured to aggregate the decrypted data; and
a storage unit configured to store at least the first cryptographic key and the second cryptographic key.

3. The aggregator node device as claimed in claim 2, wherein the storage unit is further configured to store the encrypted data to be aggregated and/or the decrypted data to be aggregated.

4. The aggregator node device as claimed in claim 1, wherein the aggregator node is further configured to receive the encrypted data from at least one child node in the network.

5. The aggregator node device as claimed in claim 1, wherein the aggregator node is further configured to send the encrypted aggregated data to a parent node in the network.

6. The aggregator node device as claimed in claim 1, wherein the secure element is further configured to randomize, at least partially, the aggregated data.

7. The aggregator node device as claimed in claim 1, wherein the secure element is further configured to randomize, at least partially, a frequency at which and/ or times at which the aggregated data is sent to a parent node in the network.

8. The aggregator node device as claimed in claim 1, wherein the secure element is further configured to only send the aggregated data to a parent node in the network when the aggregated data is different from a result of a previous aggregation.

9. The aggregator node device as claimed in claim 1, wherein the data comprise energy data.

10. A non-transitory computer readable medium programmed to perform a method by a first node in a network having a plurality of nodes for aggregating encrypted data, wherein the non-transitory computer readable medium comprises:
- instructions for receiving encrypted data from multiple nodes in the network, where each node of the multiple nodes added noise before individually encrypting the data;
- instructions for decrypting the encrypted data from each node of the multiple nodes into an unencrypted plain text form, wherein the unencrypted plain text form is only available in a highly secured piece of hardware in a secure element;
- instructions for aggregating the unencrypted plain text form from each node of the multiple nodes into a second set of data;
- instructions for encrypting the aggregated second set of data; and
- instructions for transmitting the aggregated second set of data to a second node, wherein the second node is a parent node in a network tree and the multiple nodes are child nodes in the network tree.

11. A method performed by a first node in a network having a plurality of nodes for aggregating encrypted data, the method comprising:
- receiving encrypted data from multiple nodes in the network where each node of the multiple nodes added noise before individually encrypting the data;
- decrypting the individually encrypted data from each node of the multiple nodes into an unencrypted plain text form, wherein the unencrypted plain text form is only available in a highly secured piece of hardware in a secure element;
- aggregating the unencrypted plain text form from each node of the multiple nodes into a second set of data;
- encrypting the aggregated second set of data; and
- transmitting the aggregated second set of data to a second node, wherein the second node is a parent node in a network tree and the multiple nodes are child nodes in the network tree.

12. The method of claim 11, wherein the child nodes are energy meters on a grid.

* * * * *